US010421377B2

(12) United States Patent
Tobata et al.

(10) Patent No.: US 10,421,377 B2
(45) Date of Patent: Sep. 24, 2019

(54) VEHICLE SEAT

(71) Applicant: TACHI-S CO., LTD., Tokyo (JP)

(72) Inventors: Hideo Tobata, Tokyo (JP); Takao Tsutsui, Tokyo (JP); Atsushi Koike, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 46 days.

(21) Appl. No.: 15/566,475

(22) PCT Filed: Apr. 7, 2016

(86) PCT No.: PCT/JP2016/061423
§ 371 (c)(1),
(2) Date: Oct. 13, 2017

(87) PCT Pub. No.: WO2016/167180
PCT Pub. Date: Oct. 20, 2016

(65) Prior Publication Data
US 2018/0141476 A1 May 24, 2018

(30) Foreign Application Priority Data

Apr. 14, 2015 (JP) .................................. 2015-082697

(51) Int. Cl.
*B60N 2/90* (2018.01)
*B60N 2/427* (2006.01)
(Continued)

(52) U.S. Cl.
CPC ........... *B60N 2/42709* (2013.01); *B60N 2/20* (2013.01); *B60N 2/22* (2013.01); *B60N 2/4221* (2013.01);
(Continued)

(58) Field of Classification Search
CPC .... B60N 2/42709; B60N 2/4221; B60N 2/90; B60N 2/20; B60N 2/22; B60N 2/688; B60R 22/26
(Continued)

(56) References Cited

U.S. PATENT DOCUMENTS 3,877,748 A 4/1975 Eggert
4,076,306 A 2/1978 Satzinger
(Continued)

FOREIGN PATENT DOCUMENTS

CN 1660630 A 8/2005
EP 0 735 960 B1 5/2000
(Continued)

OTHER PUBLICATIONS

International Search Report, for International Application No. PCT/JP2016/061423, dated Jun. 21, 2016, 5 pages (with English Translation).
(Continued)

*Primary Examiner* — Mark R Wendell
(74) *Attorney, Agent, or Firm* — Seed IP Law Group LLP

(57) ABSTRACT

A vehicle seat includes a pair of side frames, a seat back which includes a pair of connecting parts which respectively support the pair of side frames to be tiltable to a front side of a seat, and a seat belt which includes an upper body restricting part, which restricts an upper body of an occupant in the seat back, and in which the upper body restricting part is moored in the side frame. The connecting part which supports the side frame includes a base part which is fixed in a frame of the seat cushion, and a force limiter part which is interposed between the base part and the side frame and allows tilting of the side frame through a plastic deformation when a tensile force exceeding a predetermined value is loaded on the upper body restricting part of the seat belt.

4 Claims, 9 Drawing Sheets

(51) Int. Cl.
*B60R 22/26* (2006.01)
*B60N 2/20* (2006.01)
*B60N 2/68* (2006.01)
*B60N 2/22* (2006.01)
*B60N 2/42* (2006.01)

(52) U.S. Cl.
CPC ............... *B60N 2/688* (2013.01); *B60N 2/90* (2018.02); *B60R 22/26* (2013.01)

(58) Field of Classification Search
USPC .................................................... 297/216.13
See application file for complete search history.

(56) References Cited

U.S. PATENT DOCUMENTS

| | | | |
|---|---|---|---|
| 4,145,081 A | 3/1979 | Withers | |
| 4,804,226 A * | 2/1989 | Schmale | B60N 2/688 297/216.13 |
| 5,599,070 A * | 2/1997 | Pham | B60R 22/26 280/808 |
| 5,645,316 A | 7/1997 | Aufrere | |
| 5,947,514 A * | 9/1999 | Keller | B60R 21/01512 280/735 |
| 5,984,419 A * | 11/1999 | Partington | B60N 2/0232 297/216.13 |
| 6,767,055 B1 * | 7/2004 | Sparks | B60N 2/162 297/216.13 |
| 7,510,245 B2 * | 3/2009 | Okazaki | B60R 22/26 297/182 |
| 7,871,105 B2 * | 1/2011 | Itoga | B60R 21/18 280/730.1 |
| 8,864,227 B2 * | 10/2014 | Funke | B64D 11/06 297/216.13 |
| 2003/0230872 A1 * | 12/2003 | Sakai | B60N 2/4221 280/728.1 |
| 2004/0041390 A1 * | 3/2004 | Tomita | B60R 22/023 280/806 |
| 2005/0189749 A1 | 9/2005 | Itaoga et al. | |
| 2009/0140559 A1 * | 6/2009 | Andou | B60R 21/0136 297/216.1 |

FOREIGN PATENT DOCUMENTS

| | | |
|---|---|---|
| JP | 50-132621 A | 10/1975 |
| JP | 52-49529 A | 4/1977 |
| JP | 9-24756 A | 1/1997 |
| JP | 2013-177049 A | 9/2013 |

OTHER PUBLICATIONS

Written Opinion of the International Searching Authority, for International Application No. PCT/JP2016/061423, dated Jun. 21, 2016, 8 pages (with English Translation).
Chinese Office Action dated Dec. 3, 2018 for Chinese Application No. 201680022162.2, 6 pages. (With English Translation).

* cited by examiner

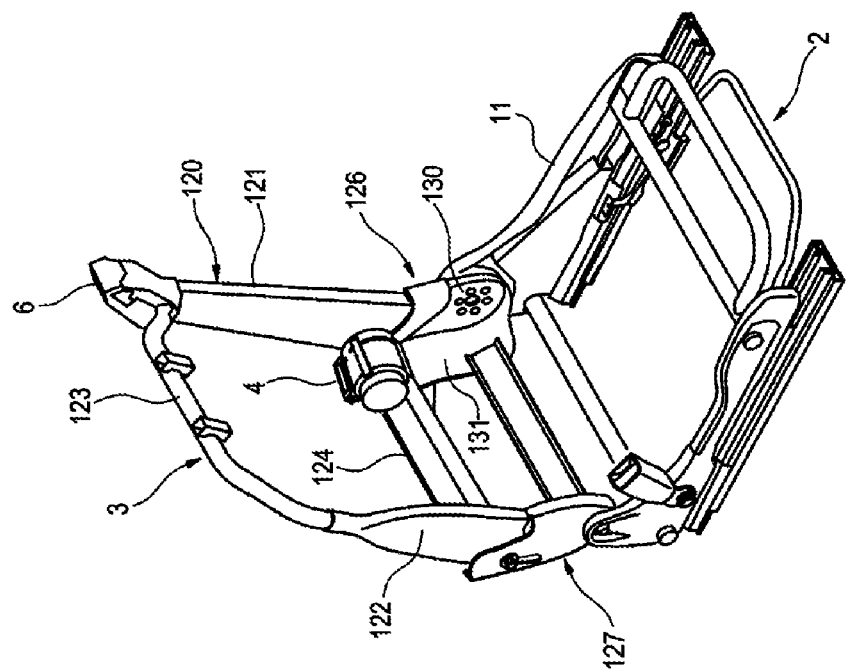
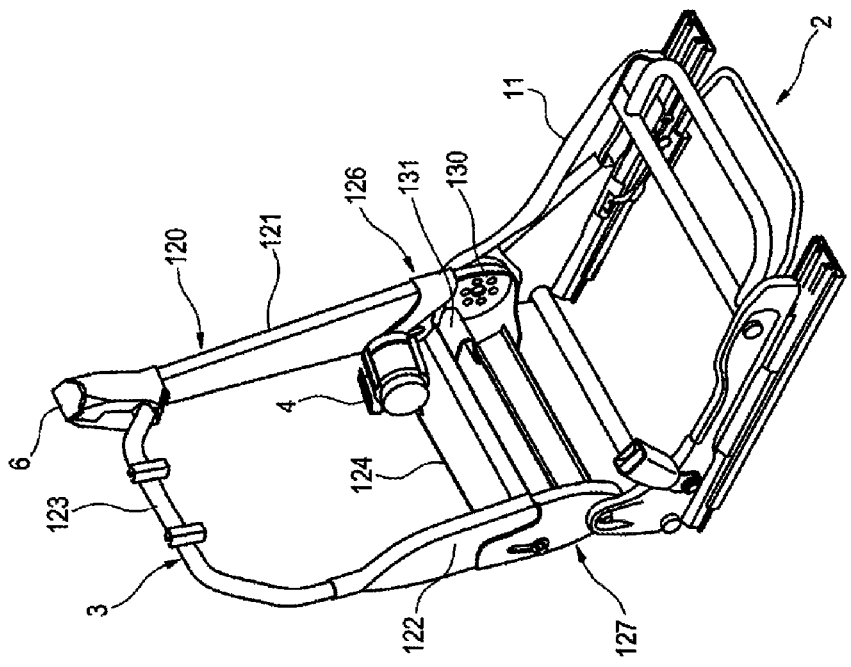

VEHICLE SEAT

TECHNICAL FIELD

The present invention relates to a vehicle seat.

BACKGROUND ART

A seat belt is used as a safety device which protects an occupant during a vehicle collision, and a force limiter of the seat belt is known as an accessory device for improving a performance of protecting the occupant. The force limiter gradually loosens a shoulder belt which is obliquely hung from a shoulder of the occupant to a waist, so as to alleviate an impact which is applied to the upper body of the occupant restricted by the shoulder belt. Typically, the force limiter is provided in a retractor which winds the seat belt.

In addition, similarly to the above-described force limiter, a vehicle seat is known which is configured to alleviate an impact, which is applied to an upper body of the occupant restricted by the shoulder belt, by a plastic deformation of a frame material of the seat (for example, see Patent Document 1).

The vehicle seat described in Patent Document 1 is a so-called belt-in seat in which the retractor which winds the seat belt is embedded. A frame of a seat back is divided into a lower structure and an upper structure which is supported by the lower structure to be tiltable to a front side of a seat, and an upper end of the shoulder belt is moored in a side frame of one side of the upper structure. Further, a torsion bar is bridged between the side frame of one side of the upper structure which moors the shoulder belt and an opposite side frame of the lower structure. When a tensile force exceeding a predetermined value is loaded on the shoulder belt, the upper structure is tilted to the front side of the seat in accordance with a torsion of the torsion bar such that the impact is alleviated.

RELATED ART REFERENCE

Patent Document

Patent Document 1: JP-A-H09-24756

SUMMARY OF THE INVENTION

Problems to be Solved by the Invention

In the force limiter which loosens the shoulder belt gradually, when the upper body of the occupant is tilted to the front side of the seat, a gap is formed between the upper body of the occupant and the seat back, and there is a concern that the upper body which is bent backward to the rear side of the seat according to the reaction to the tilting to the front side of the seat is hit by the seat back. In addition, in the occupant of the rear seat, there is a concern that the upper body which is tilted to the front side of the seat is hit by the seat back of the front seat.

With regard thereto, in the vehicle seat described in Patent Document 1, the upper structure of the seat back is tilted together with the upper body of the occupant to the front side of the seat, and thus it is suppressed that the gap is formed between the upper body of the occupant and the seat back. It is alleviated that the upper body abuts on the seat back when the upper body is bent backward to the rear side of the seat according to the reaction to the tilting to the front side of the seat. In addition, in the occupant of the rear seat, the space from the upper structure is enlarged when the upper structure of the seat back of the front seat is tilted to the front side of the seat, and it is suppressed that the upper body abuts on the seat back of the front seat.

However, in the vehicle seat described in Patent Document 1, the torsion bar is provided to be bridged between the side frame of one side of the upper structure and the side frame of the opposite side of the lower structure and to cross the seat back in a seat width direction. For this reason, it is necessary to avoid an interference between the torsion bar and another device mounted in the seat back such as a lumbar support, and the configuration of the seat back becomes complicated.

The invention has been made in consideration of the above situation, and an object thereof is to provide a vehicle seat in which a performance of protecting an occupant can be improved, and a configuration is simplified.

Means for Solving the Problems

A vehicle seat according to one aspect of the invention includes: a seat cushion; a seat back including a pair of side frames which are arranged with an interval in a seat width direction and a pair of connecting parts which respectively support the pair of side frames to be tiltable to a front side of a seat and are respectively connected with a frame of the seat cushion; and a seat belt which includes an upper body restricting part which restricts an upper body of an occupant in the seat back and in which the upper body restricting part is moored in one side frame of the pair of side frames. The connecting part, which supports the side frame which moors the upper body restricting part, of the pair of connecting parts includes a base part which is fixed in the frame of the seat cushion, and a force limiter part which is interposed between the base part and the side frame and allows tilting of the side frame through a plastic deformation when a tensile force exceeding a predetermined value is loaded on the upper body restricting part of the seat belt.

Advantages of the Invention

According to the invention, the vehicle seat can be provided in which the performance of protecting the occupant can be improved, and the configuration is simplified.

BRIEF DESCRIPTION OF THE DRAWINGS

FIGS. 9A and 9B are perspective views illustrating a motion of the vehicle seat in FIG. 7.

MODES FOR CARRYING OUT THE INVENTION

Figure 1:
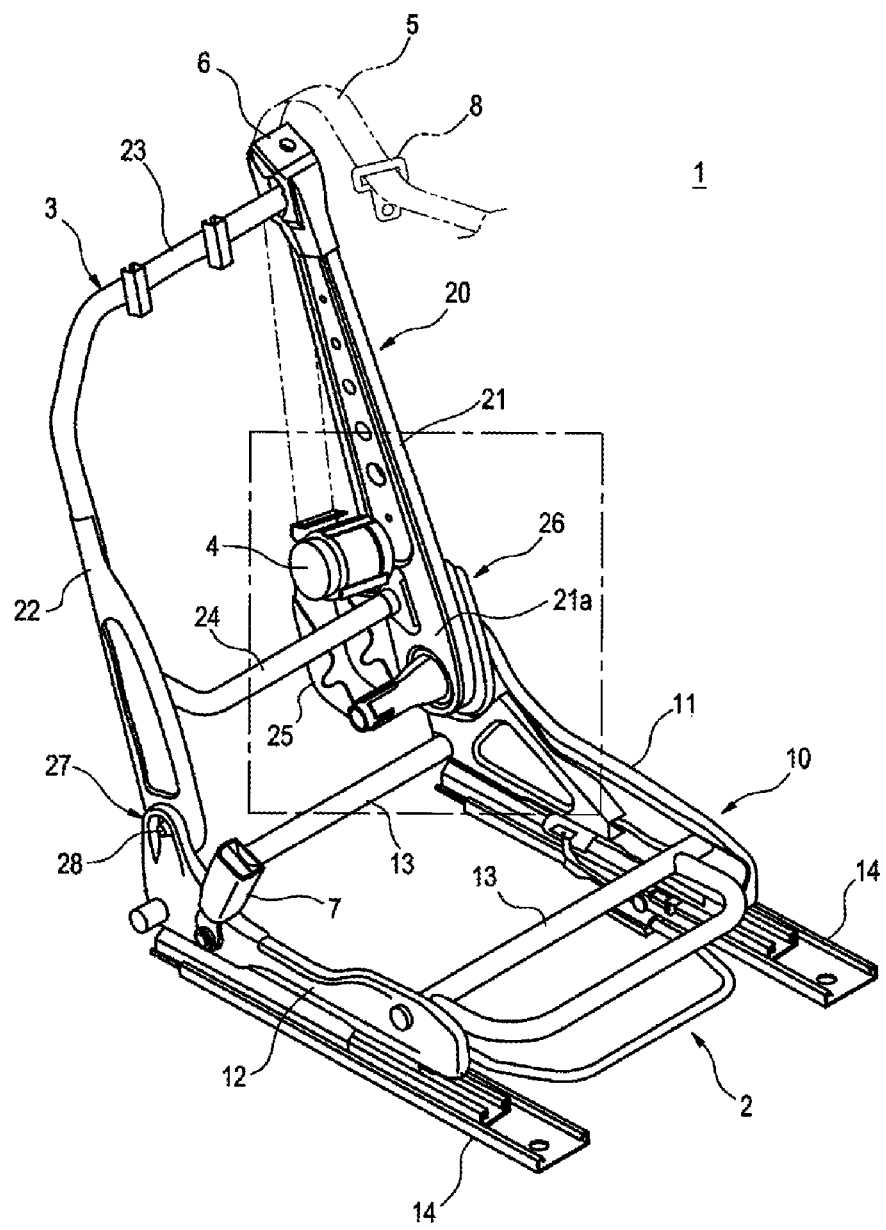
FIG. 1 is a perspective view of one example of a vehicle seat for explaining an embodiment of the invention.

FIG. 1 illustrates a configuration of one example of a vehicle seat for explaining an embodiment of the invention.

A vehicle seat 1 includes a seat cushion 2 configuring a seat surface portion and the seat back 3 configuring a back rest portion.

The seat cushion 2 includes a cushion frame 10 forming a frame of the seat cushion 2. Incidentally, the cushion frame 10 (not illustrated) is covered with a cushion pad made of a relatively soft foamed resin material such as urethane foam, and further is covered with a cover made of a seat material such as vinyl chloride.

The cushion frame 10 is configured to include a pair of cushion side frames 11 and 12 which are arranged with an interval in the seat width direction, and a plurality of cross frames 13 which connect the pair of cushion side frames 11 and 12 with each other. In addition, in the illustrated example, a rail 14 which supports the vehicle seat 1 to be move slidably in a seat front-and-rear direction is attached in each of the cushion side frames 11 and 12.

The seat back 3 includes a back frame 20 forming a frame of the seat back 3. Incidentally, the back frame 20 (not illustrated) also is covered with a cushion pad or a cover similarly to the cushion frame 10 of the seat cushion 2.

The back frame 20 is configured to include a pair of back side frames 21 and 22 which are arranged with an interval in the seat width direction, an upper cross frame 23 which connects upper ends of the back side frames 21 and 22 with each other, and a lower cross frame 24 which connects lower ends of the back side frames 21 and 22 with each other. Incidentally, in the illustrated example, the upper cross frame 23 and the lower cross frame 24 are formed integrally by bending a frame material.

A retractor 4 which winds a seat belt 5 is embedded in the seat back 3. The retractor 4 is arranged to be deviated to one back side frame 21 side, and is fixed in the lower cross frame 24 through a retractor fixing bracket 25.

The seat belt 5 is moored in an anchor 6 provided in the upper end of the back side frame 21 to be drawn to the front surface side of the seat back 3, and is fixed in the side portion of the seat cushion 2 on the back side frame 21 side. When the seat belt 5 is used, a latch plate 8 is locked in a buckle 7 provided in the side portion of the seat cushion 2 on a back side frame 22 side, and the shoulder belt (upper body restricting part) between the anchor 6 and the buckle 7 is obliquely hung from the shoulder of the occupant to the waist, and the upper body of the occupant is restricted in the seat back 3 by the shoulder belt.

The retractor 4 is configured to lock the seat belt 5 such that the feeding of the seat belt 5 is prevented in a case where a drastic deceleration acts thereon due to the vehicle collision and the like. Incidentally, the retractor 4 may have a so-called pretensioner function that the seat belt 5 is wound automatically to restrict the upper body of the occupant in the seat back 3 actively in a case where a drastic deceleration acts thereon. However, the retractor 4 does not have a force limiter function that gradually loosens the shoulder belt.

The seat back 3 further includes a connecting part 26 which supports the back side frame 21 provided with the anchor 6 and is connected in one cushion side frame 11 of the cushion frame 10 on the same side as the back side frame 21, and a connecting part 27 which supports the other back side frame 22 and is connected in the other cushion side frame 12 of the cushion frame 10.

In this example, the connecting part 26 is connected in the cushion side frame 11 through a reclining mechanism which makes a tilting angle of the seat back 3 to the rear side of the seat to be variable. The connecting part 27 is connected in the cushion side frame 12 by a pivot 28 which is provided on the tilted axis of the seat back 3 which is tilted by the reclining mechanism to the rear side of the seat.

Incidentally, the connecting part 27 also may be connected in the cushion side frame 12 through the reclining mechanism. In this case, a connection bar is configured to be bridged between the reclining mechanism on the connecting part 26 side and the reclining mechanism on the connecting part 27 side, such that a lock release operation in one reclining mechanism is transferred to the other reclining mechanism.

Figure 2:
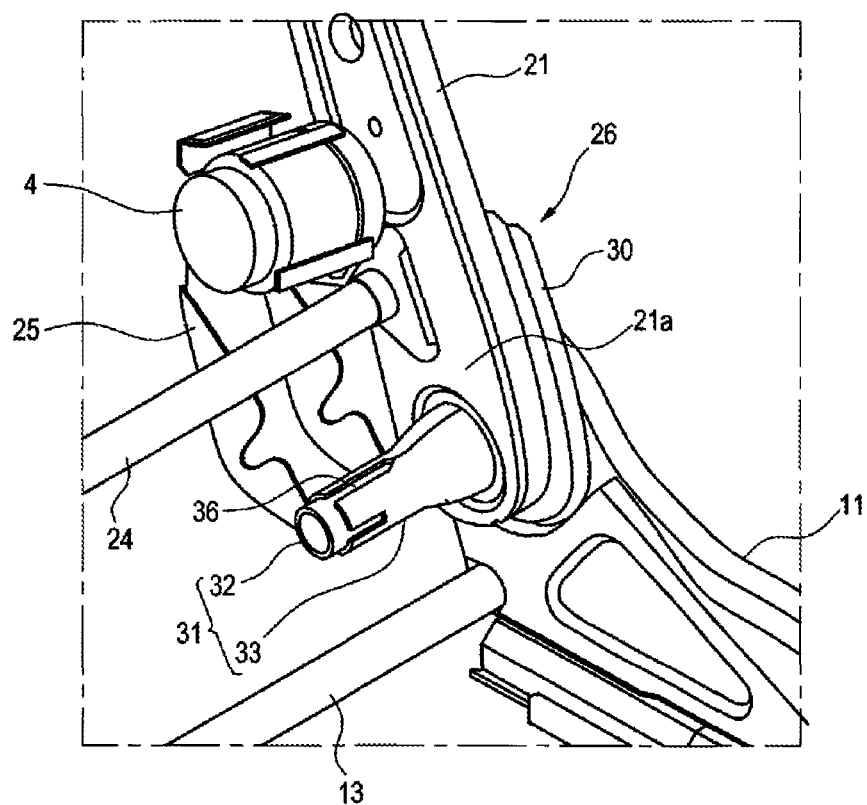
FIG. 2 is an enlarged perspective view of a portion surrounded by a one-dot chain line frame in FIG. 1.
Figure 3:
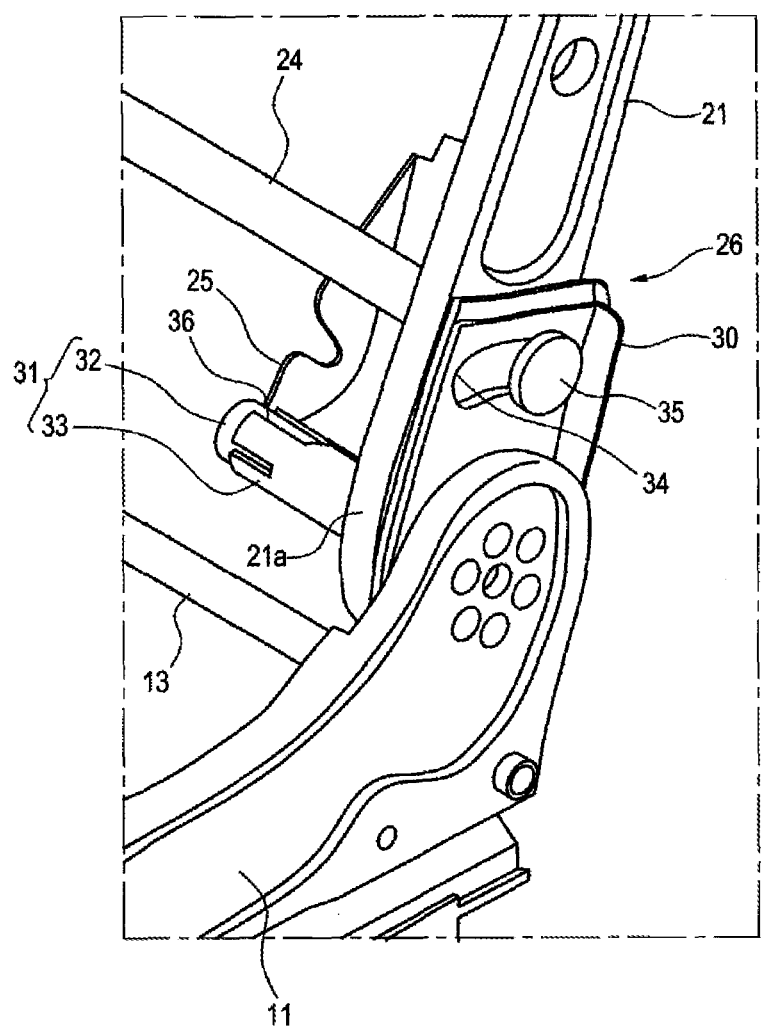
FIG. 3 is an enlarged perspective view of the portion surrounded by the one-dot chain line frame in FIG. 1.
Figure 4:
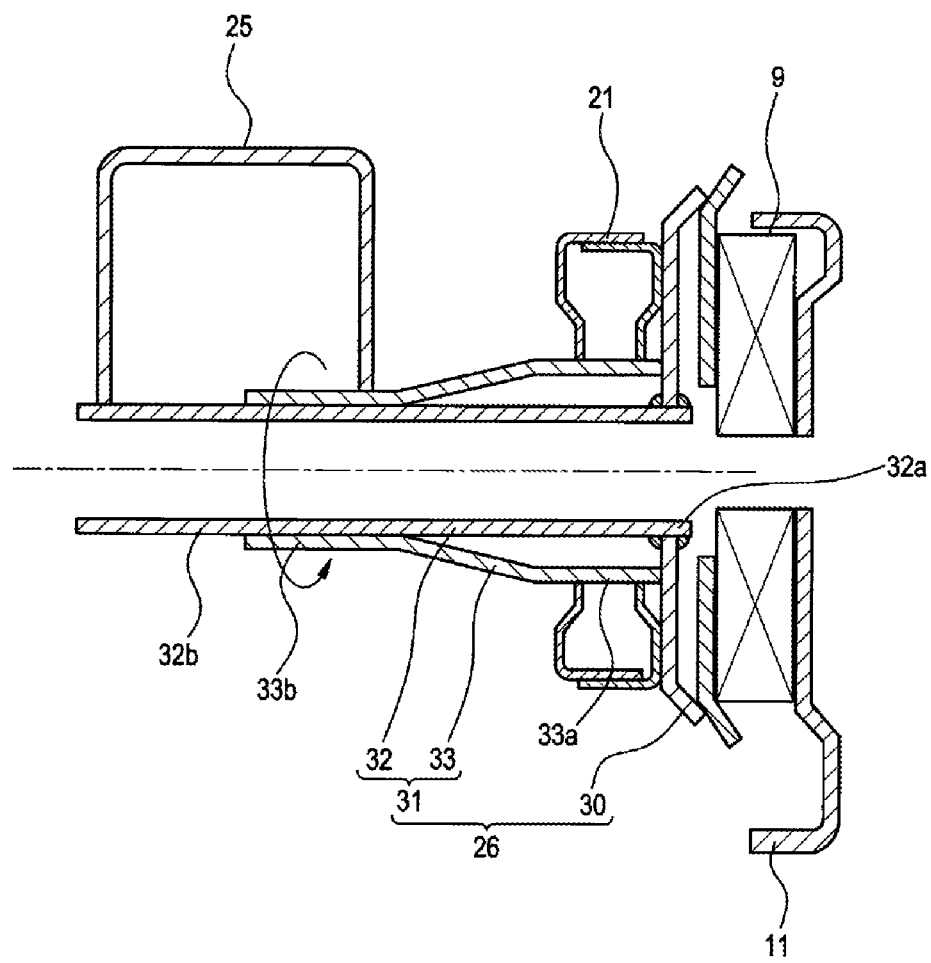
FIG. 4 is a sectional view of the portion surrounded by the one-dot chain line frame in FIG. 1.

FIGS. 2 to 4 illustrate the configuration of the connecting part 26.

The connecting part 26 includes a base part 30 and a force limiter part 31 which is interposed between the base part 30 and the back side frame 21. Further, the force limiter part 31 includes a shaft 32 and a bracket 33.

The base part 30 is provided between a lower end 21a and a reclining mechanism 9 to be overlapped with the lower end 21a of the back side frame 21 in the seat width direction, and is fixed in the reclining mechanism 9.

The shaft 32 is made of a cylindrical material having a circular cross section, and is provided to penetrate the lower end 21a of the back side frame 21. A base end 32a of the shaft 32 which protrudes to the outside of the back side frame 21 is fixed in the base part 30, and the shaft 32 is fixed in the cushion side frame 11 through the base part 30 and the reclining mechanism 9. The back side frame 21 is tiltable about the shaft 32 to the front side of the seat.

A long hole 34 which extends in an arc shape with the shaft 32 as a center is formed in the base part 30, and a stopper pin 35 which is inserted into the long hole 34 is provided in the back side frame 21. The stopper pin 35 moves in the long hole 34 toward the front side of the seat in accordance with the tilting of the back side frame 21, and abuts on the front edge of the long hole 34. The motion range of the back side frame 21 is regulated by the long hole 34 and the stopper pin 35.

In this example, the shaft 32 matches with the tilted axis of the seat back 3 which is tilted to the rear side of the seat by the reclining mechanism 9. The back side frame 22 which is connected in the cushion side frame 12 by the pivot 28 of the connecting part 27 arranged on the tilted axis is made to be tiltable to the front side of the seat about the pivot 28.

Incidentally, the shaft 32 may be a solid rod. However, in a case where the reclining mechanism is provided also in the connecting part 27, and the back side frame 22 is also connected in the cushion side frame 12 through the reclining mechanism, when the shaft 32 is configured of a cylindrical material, the connection bar for synchronizing lock release in the reclining mechanism 9 on the connecting part 26 side and the reclining mechanism on the connecting part 27 side can be inserted into the shaft 32, and the shaft 32 can be allowed to match with the tilted axis of the reclining.

The bracket 33 is made as a cylindrical body, and is arranged on the outside of the shaft 32 to have the same axis as the shaft 32. Further, the base end 33a of the bracket 33 is fixed in the back side frame 21, and a tip 33b of the bracket 33 is fixed in the tip 32b of the shaft 32.

Figure 5A:
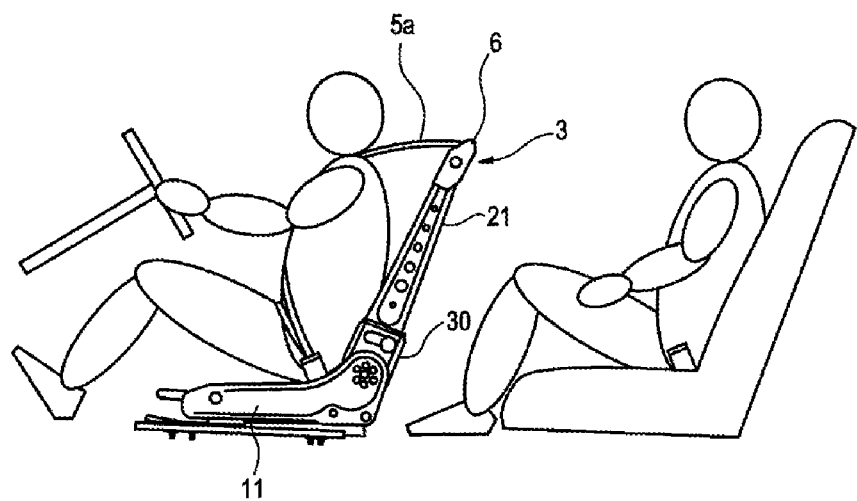
FIGS. 5A and 5B are side views illustrating a motion of the vehicle seat in FIG. 1.
Figure 5B:
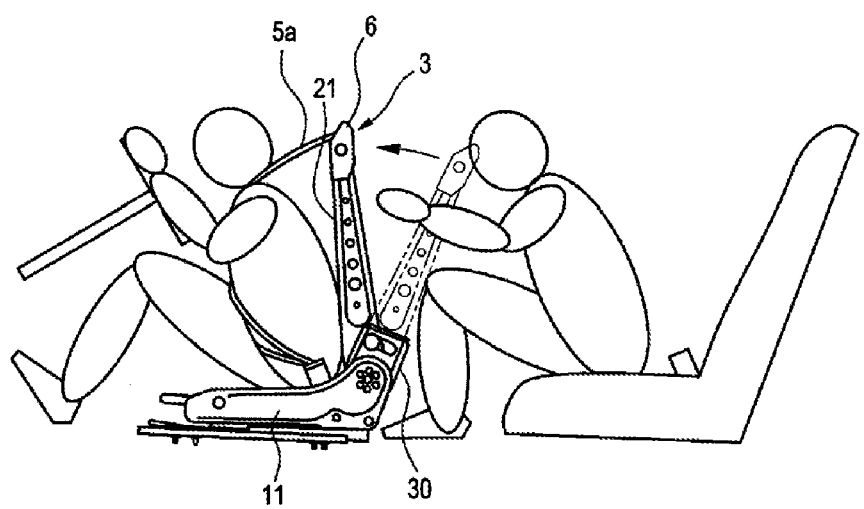

FIGS. 5A and 5B illustrate the motion of the vehicle seat 1. During the vehicle collision and the like, the upper body of the occupant which is tilted to the front side of the seat by the inertia is restricted in the seat back 3 by the shoulder belt 5a. The tensile force which is loaded on the shoulder belt 5a at this time is transferred to the bracket 33 of the force limiter part 31 through the back side frame 21 provided with the anchor 6 in which the shoulder belt 5a is moored, and acts on the shaft 32 as a torque which makes a torsion in the intermediate portion of the shaft 32 between the tip 32b of the shaft 32 in which the bracket 33 is fixed and the base end 32a of the shaft 32 which is fixed in the base part 30.

The way to fix the tip 33b of the bracket 33 and the tip 32b of the shaft 32 which transfer the torque is not limited particularly, and for example, welding may be used. When the bracket 33 is arranged as a cylindrical body to have the same axis as the shaft 32, the length of the welded tips 32b and 33b can be ensured even in a limited space, and an enough fixation strength can be obtained between the bracket 33 and the shaft 32.

Incidentally, as illustrated in FIG. 2, when a plurality of slits 36 which extend from the tip of the bracket 33 in an axial direction are provided in the bracket 33 and are welded together with the edges of the slits 36, the fixation strength between the bracket 33 and the shaft 32 can be improved further.

When the torque acting on the shaft 32 exceeds an allowable load of the shaft 32, the plastic deformation (torsion) occurs in the shaft 32, and the back side frame 21 is tilted about the shaft 32 to the front side of the seat. In addition, the other back side frame 22 which is welded with the back side frame 21 is also tilted about the pivot 28 to the front side of the seat by the upper cross frame 23 and the lower cross frame 24. An energy is absorbed by the plastic deformation of the shaft 32, and the impact which is applied to the upper body of the occupant restricted by the shoulder belt 5a is alleviated.

The back side frames 21 and 22 are tilted to the front side of the seat, that is, the seat back 3 is tilted to the front side of the seat, so that it is suppressed that a gap is formed between the upper body of the occupant tilted to the front side of the seat and the seat back 3, and it is alleviated that the upper body and the seat back 3 abut on each other when the upper body is bent backward to the rear side of the seat according to the reaction to the tilting to the front side of the seat. In addition, in the occupant of the rear seat, the space from the seat back 3 of the front seat is enlarged when the seat back 3 of the front seat is tilted to the front side of the seat, and it is suppressed that the upper body abuts on the seat back 3 of the front seat.

Particularly, in this example, the shaft 32 and the pivot 28 match with the tilted axis of the seat back 3 which is tilted to the rear side of the seat by the reclining mechanism 9, and are provided in the lower end of the seat back 3. Thus, the space from the occupant of the rear seat can be enlarged further in accordance with the tilting of the seat back 3 of the front seat.

In the above-described configuration of the vehicle seat 1, the shaft 32 which allows the tilting of the back side frames 21 and 22 by the plastic deformation is provided in the connecting part 26 which connects one back side frame 21 and the cushion side frame 11 on the same side, and is provided on one side of the seat back 3. For this reason, compared to a case where the shaft 32 is provided to cross the seat back 3 in the seat width direction, it is suppressed that the shaft 32 interferes with another device mounted in the seat back 3, and the configuration of the seat back 3 is simplified.

Figure 6:
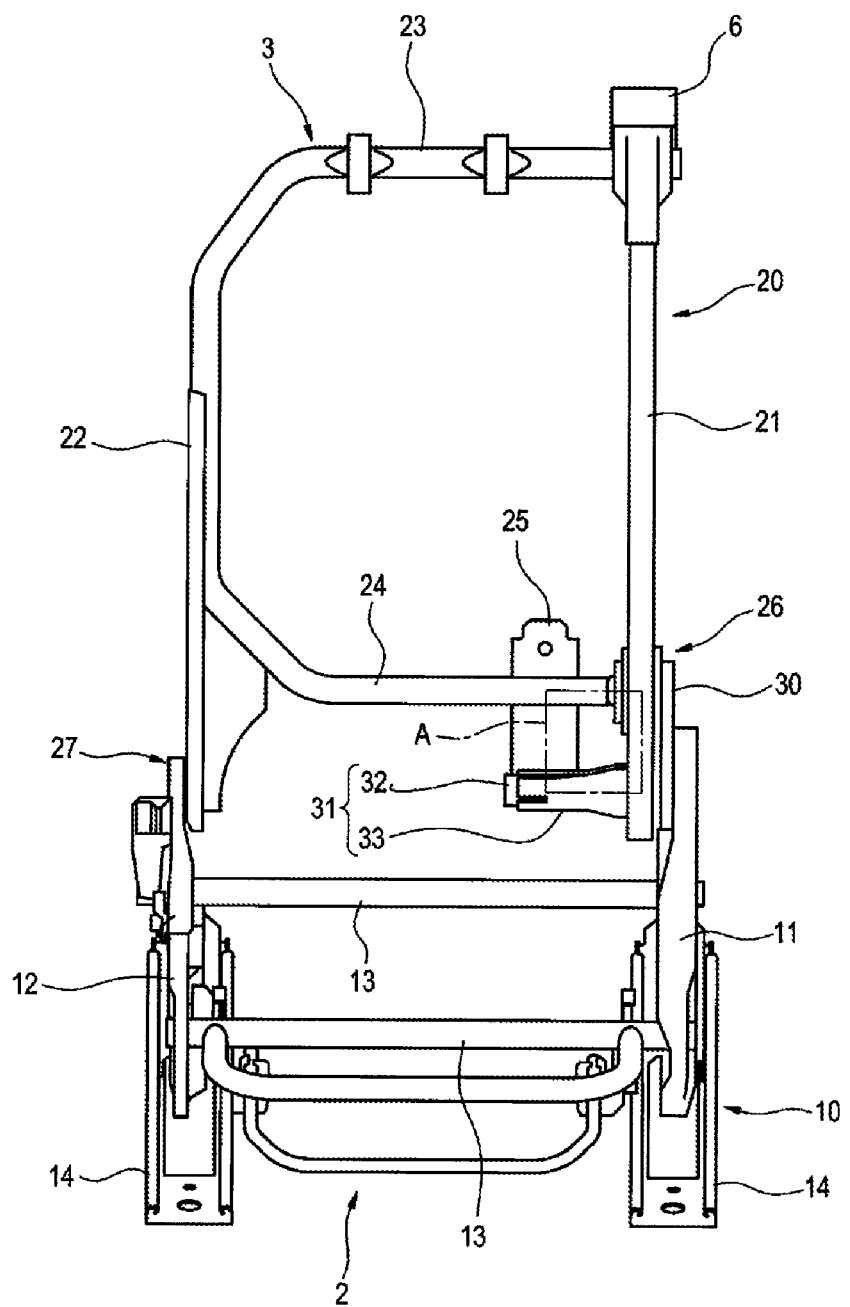
FIG. 6 is a front view of a modification of the vehicle seat of FIG. 1.

Incidentally, the tensile force of the shoulder belt 5a is loaded on the back side frame 21, so that the back side frame 21 and the connecting part 26 may be tilted in the seat width direction. In this regard, as illustrated in FIG. 6, the retractor fixing bracket 25 which is fixed in the lower cross frame 24 arranged in the upper side of the bracket 33 is extended to the bracket 33 and is fixed also in the bracket 33, and the tilting of the back side frame 21 and the connecting part 26 in the seat width direction can be suppressed when the lower cross frame 24 and the retractor fixing bracket 25 surround a closed area A between the back side frame 21 and the bracket 33.

Figure 7:
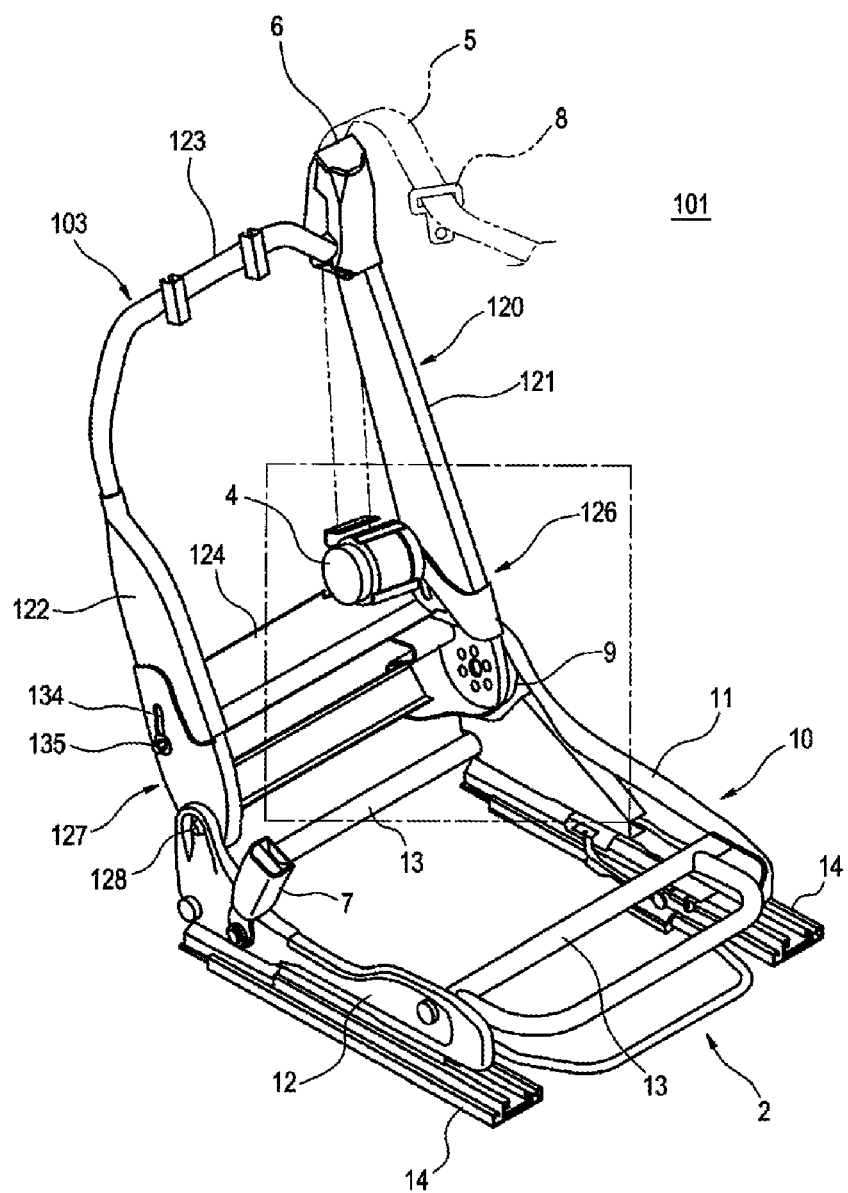
FIG. 7 is a perspective view of another example of the vehicle seat for explaining the embodiment of the invention.
Figure 8:
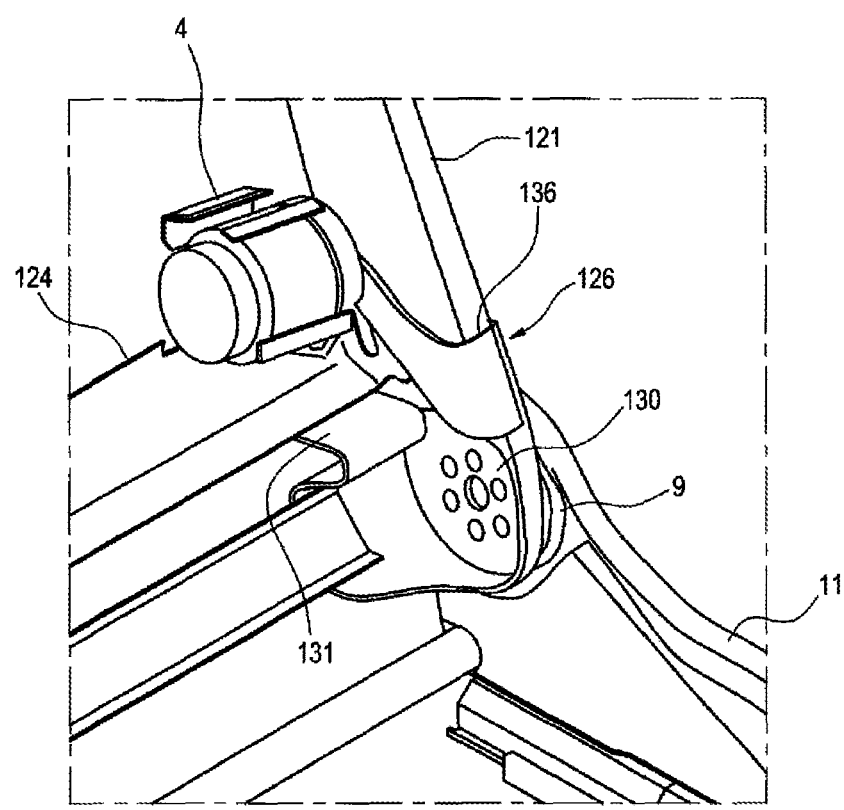
FIG. 8 is an enlarged perspective view of a portion surrounded by a one-dot chain line frame in FIG. 7.

FIGS. 7 and 8 illustrate a configuration of another example of the vehicle seat for explaining the embodiment of the invention. Incidentally, the common components as the above-described vehicle seat 1 are denoted by the common reference numerals, and the description is not given or simplified.

In a vehicle seat 101 illustrated in FIG. 7, a back frame 120 of a seat back 103 includes a pair of back side frames 121 and 122, and an upper cross frame 123 and a lower cross frame 124 which connect the pair of back side frames 121 and 122 to each other. The retractor 4 embedded in the seat back 103 is arranged to be deviated to one back side frame 121 side, and is fixed in the lower cross frame 124, and the anchor 6 which moors the shoulder belt (upper body restricting part) of the seat belt 5 is provided in the upper end of the back side frame 121.

The seat back 103 further includes a connecting part 126 which supports the back side frame 121 provided with the anchor 6 and is connected in one cushion side frame 11 of the cushion frame 10 on the same side as the back side frame 121, and a connecting part 127 which supports the other back side frame 122 and is connected in the other cushion side frame 12 of the cushion frame 10.

Also in this example, the connecting part 126 is connected in the cushion side frame 11 through the reclining mechanism 9 which makes the tilting angle of the seat back 103 to the rear side of the seat to be variable. The connecting part 127 is connected in the cushion side frame 12 by a pivot 128 which is provided on the tilted axis of the seat back 103 which is tilted to the rear side of the seat by the reclining mechanism 9.

The connecting part 126 includes a base part 130 fixed in the reclining mechanism 9 and a force limiter part 131 interposed between the base part 130 and the back side frame 121.

A slot 136 into which the lower end of the back side frame 121 is inserted is provided in the base part 130, and the back side frame 121 is made to be tiltable to the front side of the seat with the front edge of the lower end inserted into the slot 136 as a support point.

The force limiter part 131 is configured of a strip plate, and in the illustrated example, is formed integrally with the base part 130. One end of the force limiter part 131 is fixed in the base part 130, and is fixed indirectly in the cushion side frame 11 through the base part 130 and the reclining mechanism 9. Incidentally, one end of the force limiter part 131 may be fixed directly in the cushion side frame 11. The other end of the force limiter part 131 is fixed in the lower cross frame 124, and is fixed in the back side frame 121 through the lower cross frame 124. Further, at least a portion between both ends of the force limiter part 131 is bent to protrude to the front side of the seat from a linear line which couples the both ends of the force limiter part 131. Incidentally, at least a portion between the both ends of the force limiter part 131 may be bent to protrude to the rear side of the seat from the linear line which couples the both ends of the force limiter part 131.

The connecting part 127 also includes a slot into which the lower end of the back side frame 122 is inserted, and the back side frame 122 is tiltable to the front side of the seat with the front edge of the lower end inserted into the back side frame 122 as a support point. In addition, a long hole 134 which extends in the arc shape is formed in the connecting part 127, and a stopper pin 135 inserted into the long hole 134 is provided in the back side frame 122. The motion range of the back side frame 122 which is tilted to the front side of the seat is regulated by the long hole 134 and the stopper pin 135.

FIGS. 9A and 9B illustrate a motion of the vehicle seat 101. During the vehicle collision and the like, the tensile force which is loaded on the shoulder belt which restricts the upper body of the occupant tilted to the front side of the seat by the inertia in the seat back 103 is transferred to the force limiter part 131 through the back side frame 121 and the lower cross frame 124 provided with the anchor 6, and acts on the force limiter part 131 as the tensile force which extends the intermediate portion of the bent force limiter part 131.

When the tensile force acting on the force limiter part 131 exceeds the allowable load of the force limiter part 131, the plastic deformation (extension) occurs in the bent force limiter part 131, and the back side frame 121 is tilted to the front side of the seat with the font edge of the lower end inserted into the base part 130 of the connecting part 126 as a support point. In addition, the back side frame 122 which is connected in the back side frame 121 by the upper cross frame 123 and the lower cross frame 124 also is tilted to the front side of the seat with the front edge of the lower end inserted into the connecting part 127 as a support point. The energy is absorbed by the plastic deformation of the force limiter part 131, and the impact which is applied to the upper body of the occupant restricted by the seat belt 5 is alleviated.

The back side frames 121 and 122 are tilted to the front side of the seat, that is, the seat back 103 is tilted to the front side of the seat, so that it is suppressed that a gap is formed between the upper body of the occupant tilted to the front side of the seat and the seat back 103, and it is alleviated that the upper body and the seat back 103 abut on each other when the upper body is bent backward to the rear side of the seat according to the reaction to the tilting to the front side of the seat. In addition, in the occupant of the rear seat, the space from the seat back 103 of the front seat is enlarged when the seat back 103 of the front seat is tilted to the front side of the seat, and it is suppressed that the upper body abuts on the seat back 103 of the front seat.

In the above-described configuration of the vehicle seat 101, the force limiter part 131 which allows the tilting of the back side frames 121 and 122 by the plastic deformation is provided in the connecting part 126 which connects one back side frame 121 and the cushion side frame 11 on the same side, and is provided on one side of the seat back 103. For this reason, similarly to the above-described vehicle seat 1, it is suppressed that the force limiter part 131 interferes with another device mounted in the seat back 103, and the configuration of the seat back 103 is simplified.

INDUSTRIAL APPLICABILITY

According to the invention, the vehicle seat can be provided in which the performance of protecting the occupant can be improved, and the configuration is simplified.

The present application is based on Japanese Patent Application (No. 2015-082697) filed on Apr. 14, 2015. The contents thereof are incorporated hereinto by reference.

DESCRIPTION OF REFERENCE NUMERALS AND SIGNS 1 vehicle seat
2 seat cushion
3 seat back
4 retractor
5 seat belt
5a shoulder belt (upper body restricting part)
6 anchor
7 buckle
8 latch plate
9 reclining mechanism
10 cushion frame
11 cushion side frame
12 cushion side frame
13 cross frame
14 rail
20 back frame
21 back side frame
22 back side frame
23 upper cross frame
24 lower cross frame
25 retractor fixing bracket
26 connecting part
27 connecting part
28 pivot
30 base part
31 force limiter part
32 shaft
33 bracket
34 long hole
35 stopper pin
36 slit
101 vehicle seat
103 seat back
120 back frame
121 back side frame
122 back side frame
123 upper cross frame
124 lower cross frame
126 connecting part
127 connecting part
128 pivot
130 base part
131 force limiter part
134 long hole
135 stopper pin
136 slot

The invention claimed is:

1. A vehicle seat comprising:
a seat cushion;
a seat back including a pair of side frames which are arranged with an interval in a seat width direction and a pair of connecting parts which respectively support the pair of side frames to be tiltable to a front side of a seat and are respectively connected with a frame of the seat cushion; and
a seat belt which includes an upper body restricting part which restricts an upper body of an occupant in the seat back and in which the upper body restricting part is moored in one side frame of the pair of side frames, wherein the connecting part, which supports the side frame which moors the upper body restricting part, of the pair of connecting parts includes a base part which is fixed in the frame of the seat cushion, and a force limiter part which is interposed between the base part and the side frame and allows tilting of the side frame through a plastic deformation when a tensile force exceeding a predetermined value is loaded on the upper body restricting part of the seat belt, the force limiter part is provided on a tilted axis of the side frame and includes a shaft in which a base end is fixed in the frame of the seat cushion and a bracket which is fixed in a tip of the shaft and the side frame, and the shaft is twisted in accordance with tilting of the side frame.

2. The vehicle seat according to claim 1, wherein the bracket is a cylindrical body which is arranged on an outside of the shaft to have a same axis as the shaft, a tip of the bracket is fixed in the tip of the shaft, and a base end of the bracket is fixed in the side frame.

3. The vehicle seat according to claim 2, wherein the seat back includes a cross frame on an upper side or a lower side of the bracket, and further a reinforcing member which is fixed in each of the bracket and the cross frame and surrounds a closed area between the bracket and the side frame.

4. The vehicle seat according to claim 1, wherein:
the force limiter part includes a strip plate in which one end is fixed directly or indirectly in the frame of the seat cushion, the other end is fixed in the side frame, and at least a portion between the both ends is bent; and
the strip plate is extended in a linear shape in accordance with tilting of the side frame.

\* \* \* \* \*